United States Patent Office 3,253,019
Patented May 24, 1966

3,253,019
SUBSTITUTED TARTRONIC ACID ESTERS AND A
PROCESS FOR MAKING THE SAME
Horace R. Davis, Roseville, Minn., assignor to Minnesota
Mining and Manufacturing Company, St. Paul, Minn.,
a corporation of Delaware
No Drawing. Filed Feb. 16, 1962, Ser. No. 173,838
3 Claims. (Cl. 260—484)

This invention relates to new and useful oxazolidinediones, to tartronic ester intermediate therefor and to methods for making the same.

It is an object of this invention to provide new oxazolidinediones. Another object of the invention is to provide tartronic esters which are convertible to oxazolidinediones. A further object is to provide a novel synthesis of tartronic ester intermediates for oxazolidinediones. Yet other objects will become apparent from the disclosure and description of the invention hereinafter.

I have found that these and other objects of the invention are accomplished by reacting mesoxalic esters with unsaturated compounds are hereinafter more fully described to form substituted tartronic esters which yield substituted oxazolidinediones by further reaction with isocyanates. The term mesoxalic esters embraces esters having the formula:

$$O=C(CO_2R)_2$$

wherein R is a lower alkyl radical.

The unsaturated starting materials employed in the reaction have a skeletal chain of at least three carbon atoms and are selected from the group consisting of:

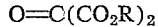

and $$Y-C\equiv C-Y'$$

wherein Y' is a member of the group consisting of hydrogen and the radicals:

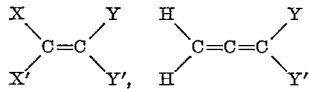

and

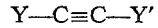

wherein Z' is a member of the group consisting of hydrogen, halogen and alkyl radicals, Z" is a member of the group consisting of H and the tartronic ester radical —C(OH)(CO$_2$R)$_2$, n is an integral number from 2 to 17 inclusive and X, X', Y and Z taken individually are selected from the group consisting of hydrogen, alkyl, cycloalkyl and aryl radicals and X' and Z taken together are a divalent alkylene radical, e.g., a polymethylene group, forming together with the 3-carbon atom chain connecting them, a stable ring system and provided that (1) Y' only contains a carboxyalkyl group when the molecule contains an X' group, (2) Y and Y' are hydrogen or lower alkyl, when the molecule contains an allenic double bond system, (3) both X and Y' are not hydrogen when a triple bond is present and (4) at least one hydrogen atom is present on a carbon atom adjacent to a multiply bonded carbon atom.

It will be apparent that Y' is effectively lower alkyl when Z and Z' are H and/or lower alkyl and that the skeletal chain must comprise at least three carbons. When Y' is the group —(C$_n$H$_{2n-2}$)Z" it includes a double bond which may be present at any part of the chain and, when Z" is H, the double bond is reactive in the process of the invention. When Z" is the tartronic ester group $$-C(OH)(CO_2R)_2$$

the double bond in Y' is only reactive in the process of the invention when it is terminal. Such further reactivity is found when the (C$_n$H$_{2n-2}$) group has the configuration

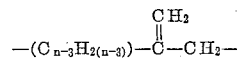

These unsaturated materials are further typified as unsaturated compounds possessing at least one allylic hydrogen and devoid of active hydrogen atoms of other types. By the term allylic hydrogen is meant a hydrogen atom on the carbon atom next to carbon-to-carbon unsaturation and hence includes what is more specifically designated a propargyllic hydrogen atom, that is a hydrogen atom on the atom next to a triple bond. It will be apparent that the allenes and compounds including the (C$_n$H$_{2n-2}$) group may possess a plurality of allylic hydrogen atoms all of which may not be available for reaction as more specifically illustrated hereinbelow.

Active hydrogen atoms of other types which should generally be avoided are illustrated by the hydrogen atoms in the following groups: primary and secondary hydroxyl, aldehyde, carboxylic, sulfonic, sulfinic and sulfenic acid, and derivatives such as amides, so-called enolizable hydrogens activated by adjacent carbonyl groups, primary and secondary amine groups, hydrazine groups and aliphatic nitro and nitroso groups. Groups which do not interfere, since they possess no active hydrogen, include, for example, halogens, alkyl, alkylene, aromatic nitro, alkoxy and aryloxy groups. Simple ester groups, e.g., acetate and benzoate, may serve to protect hydroxyl groups and render them innocuous.

Illustrative unsaturated materials suitable for use in the process of the invention include:

Propene,
Butene-1,
Butene-2,
2-methyl propene,
Allyl chloride,
Allyl bromide,
Crotyl chloride,
Isocrotyl chloride,
Pentene-1,
2-methylbutene-2,
Octene-1,
Octene-3,
Octadecene-1,
Allene,
Methylallene,
1,1-dimethylallene,
Butylallene,
Methallyl chloride,
2,3-dimethylbutene-2,
Cyclopentene, Cyclohexene,
Cyclooctene,
Allyl cyclohexane,
Allylcyclopentene,
2-cyclohexyl-butene,
1-cyclohexyl-3-methylbutene-2,
1-isopropyl-2-methylcyclopentene,
2-cyclohexylbutene-2,
Hexadiene-1,5,
2,5-dimethylhexadiene-1,5,
2,9-dimethyldecadiene-2,8,
Nonadiene-1,18,
Eicosadiene-1,19,
α-Methylstyrene,
β-Methylstyrene,
Allyl benzene,
Allylnaphthalene,
Crotylbenzene,
p-Chloro-allylbenzene,
4-bromophenyl-but-2-en-1-yl chloride,
6-methoxy-2-allylnaphthalene,
3-nitro-α-methylstyrene.

The process of the invention comprises bringing the desired unsaturated substance and the desired mesoxalic ester together in a suitable vessel and reacting the mixture at a temperature in the range of about 20° to 220° C. for a few hours and then isolating the product. No catalyst, diluent or other material is necessary to effect the reaction which proceeds very readily. It will be understood, of course, that not all reactants interact with equal ease and in general the more complex the substituents X, Y and Z the longer the times and higher the temperatures that will be required. The pressure during the reaction is the autogenous pressure in the vessel and may be up to about 100 atmospheres but is usually less.

The reaction may take place with one or more moles of mesoxalic ester depending on the structure of the product of the initial reaction and whether or not this product still possesses allylic hydrogen atoms. The initial reaction is distal to the Y and/or Y' groups of the above compounds. The cases are shown by the respective equations:

(I)
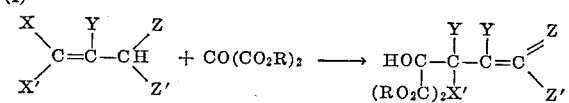

(II)
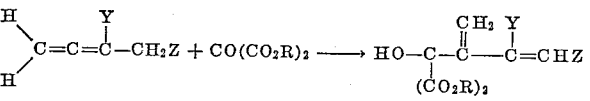

(III)
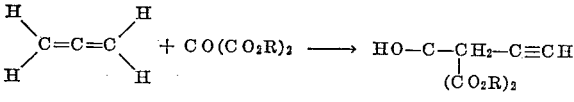

(IV)
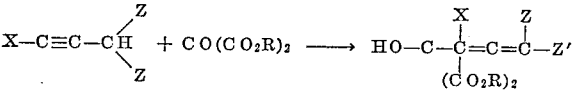

It will be seen that III (allene) is the special case of the allenic system in which Y' and Y are both hydrogen. In case II the system behaves like case I in which the X and X' groups together are a $CH_2=$ group. These products as a group are unsaturated tartronic esters.

When these esters still possess an allylic hydrogen (as hereinabove defined) reaction can occur with a second molecule of mesoxalic ester. In general, this occurs when X and/or X' is H or when a hydrogen is otherwise present in allylic position in a Y, Z or Z' group. These two successive reactions may be concurrent when an excess of the mesoxalic ester is employed for the initial reaction and consecutive when lower ratios are used for two successive reactions. It will be noted that what was the X end of the molecule is now effectively the Z end of the molecule and vice versa and when Z'' is present, Equation I above indicates the course of the reaction except that a $(C_nH_{2n-2})Z''$ group is present instead of Z'. The general equations and the generalized formulae of the tetraesters formed in the cases where X' is H are exemplified by the equations:

(V)
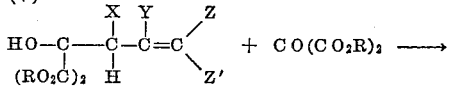

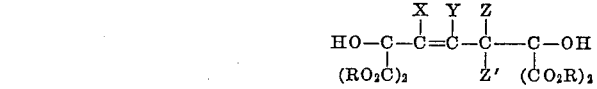

(VI)
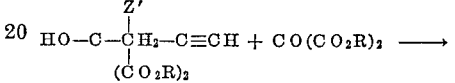

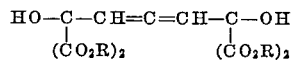

(VII)
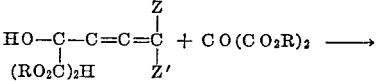

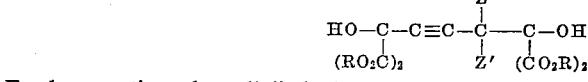

Further reaction when allylic hydrogen atoms are present, as in Equation VI, is apparently hindered by the bulk of the ester groups.

In those cases in which shift of the double bond can occur in either of two directions, two products may be and usually are obtained although not necessarily in equal amounts. For example, in that case where X, X', Z and Z' are hydrogen and Y is methyl, the product initially formed from isobutylene and diethyl mesoxalate, diethyl methallyltartronate, reacts with a second mole of diethyl mesoxalate to give a mixture of 1,1,5,5-tetrakis(carbethoxy)-3-methylenepentane-1,5-diol (A) and 1,1,5,5-tetrakis(carbethoxy)-3-methylpent-2-ene-1,5-diol (B).

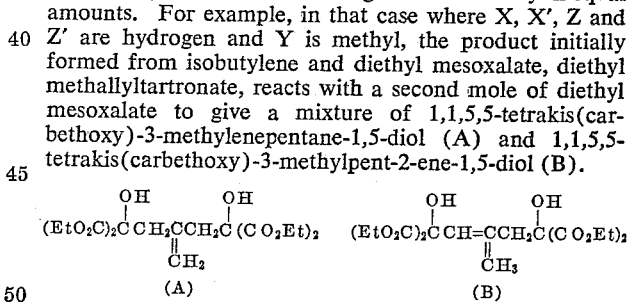

The same mixture of (A) and (B) is also obtained when two moles of mesoxalic ester are reacted with one mole of isobutylene.

It will be noted that the position of the double bond with respect to the alkyl substituents has shifted in reactions I through VII. This is shown by the structures of products when X and X' are different from Z and Z'. Such a shift of a double bond is a useful expedient in organic chemistry in degradation studies and for preparative purposes.

The reaction of allene and alkyl allenes as shown above are similar in that there is first a regression of the unsaturation from the point of attachment of the tartronate residue. Regression may also occur to the Y group or two unsaturations may form one triple bond as seen above.

Th allenic esters formed in reactions IV and VI are of further interest in that the allenic linkage may be a center of asymmetry such that both $d$ an $l$-forms may be obtained and resolved by suitable methods. When a Z'' group is present as hydrogen, reaction occurs in the presence of an excess of mesoxalic ester so that the Z'' group becomes a $-C(OH)(CO_2R)_2$ group and the position of the double bond in the $(C_nH_{2n-2})$ group shifts within the group or to achieve conjugation may move to the adjacent carbon atoms.

The product substituted tartronic acids are useful intermediates for the preparation of substituted oxazolidinediones by reaction with organic isocyanates thus

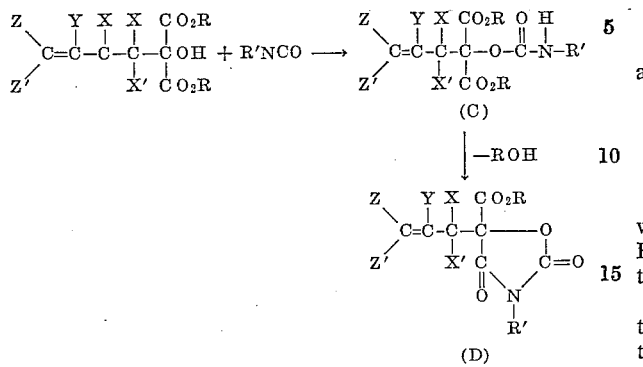

The intermediate phenylurethane (C) is not isolated but is converted directly to the oxazolidinedione during the reaction with the isocyanate. The literature of this reaction of isocyanates with tartronic esters is reviewed by J. W. Clark-Lewis in Chemical Reviews, vol. 58, pages 63–99 (1958).

Reaction of the oxazolidinedione (D) with two equivalents of dilute aqueous sodium hydroxide at room temperature followed by acidification with a mineral acid such as HCl causes saponification of the $CO_2R$ group and cleavage of the heterocyclic ring.

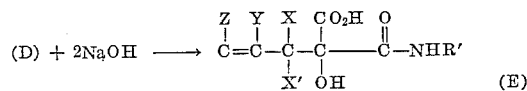

It is not possible to make (D) react with only one mole of base; an equimolar mixture of (D) and dilute sodium hydroxide gives one half the amount of product shown above (E) and one half the original amount of (D) unchanged. Heating of (E) to 120° without any catalysts causes spontaneous elimination of carbon dioxide to give (F)

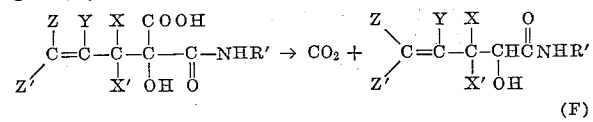

Oxazolidinediones as a class are valuable compounds since they include useful anticonvulsants and the large number provided by the invention may usefully be tested for anticonvulsant activity. It will be evident that one R group present in the original mesoxalic ester is not retained in the final oxazolidinedione. It is convenient to use the ethyl ester of mesoxalic acid but other lower alkyl esters are to be considered the full equivalent thereof.

It will be seen that the compounds of the invention are the useful intermediate tartronic esters having the structure represented by:

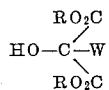

where W is a member of the group consisting of the monovalent radicals

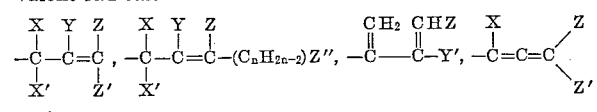

and

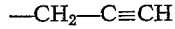

$-CH_2-C\equiv CH$ and the useful tetraesters represented by the formula:

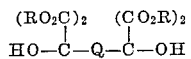

where Q is a member of the group consisting of the divalent radicals having the structures:

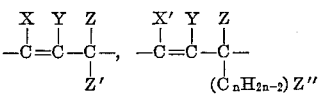

and

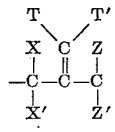

wherein T and T' are members of the group consisting of H and lower alkyl, and n, R, X, X', Y, Z, Z' and Z'' have the above significance.

The term lower alkyl is to be understood as referring to radicals having 1 through 6 carbon atoms and the term alkyl as referring to radicals having 1 through about 16 carbon atoms.

Having now generally described the invention, it is now more particularly illustrated by examples showing the best mode presently contemplated of practicing the invention. Where not otherwise specified parts are by weight, temperatures in degrees centigrade and pressures in millimeters of mercury.

EXAMPLE 1

A mixture of 174 parts of mesoxalic ester (diethyl mesoxalate) and 56 parts of isobutene is heated together for 17 hours at 140° C. in a closed reaction vessel. The vessel is then cooled and opened and the resulting amber liquid is distilled under reduced pressure. Nearly all of the material distils at 74–76° at 0.06 mm. pressure. The refractive index is 1.4423 at 21° C.

Calculated for $C_{11}H_{18}O_5$: 57.4% C, 7.9% H, saponification equivalent 115. Found: 57.2% C, 7.9% H, saponification equivalent 118. The structure is further confirmed by infrared and nuclear magnetic resonance spectroscopy. The product is diethyl methallyltartronate.

When the dimethyl or dibutyl mesoxalates are employed in corresponding proportions, the resultant products are respectively dimethyl and dibutyl methallyltartronate. Mild hydrolysis with sodium hydroxide provides sodium methallyl tartronate which is isolated by evaporation of the solution. Acidification and evaporation provides methallyl tartronic acid which can be converted by usual procedures to metallic and ammonium salts.

EXAMPLE 2

A mixture of 11 parts of diethyl mesoxalate and 2 parts of isobutylene is heated together in a closed reaction vessel for 20 hours at 165° C. The vessel is then cooled and opened and the product is distilled under reduced pressure. The material distilling at 160–170° C. at 0.1 mm. Hg pressure has a refractive index of 1.4580 at 20° C. and is a mixture of 1,1,5,5-tetrakis(carbethoxy)- 3 - methylenepentane - 1,5 - diol and 1,1,5,5-tetrakis(carbethoxy)-3-methylpent-2-ene-1,5-diol.

Calculated for $C_{18}H_{28}C_{10}$: 53.4% C, 6.9% H. Found: 53.5% C, 6.7% H. The structure of the product is further confirmed by infrared and nuclear magnetic resonance spectroscopy.

The same product is obtained when a mixture of 6 parts of diethyl mesoxalate and 7 parts of diethyl methallyltartronate is heated for 18 hours at 165° C. in a closed reaction vessel. The product is isolated by distillation under reduced pressure at 160°–165° at 0.1 mm. Hg pressure. The structure is confirmed by infrared and nuclear magnetic resonance spectroscopy.

EXAMPLE 3

The procedure of Example 1 is repeated employing a series of unsaturated compounds with diethyl mesoxalate to produce the diethyl tartronates having substituted-allyl groups as shown in Table 1.

Table 1

| Unsaturated compound | Temp., °C. | Time, hours | Substituted Allyl Groups of Product Tartronate |
|---|---|---|---|
| Cyclohexene | 220 | 48 | 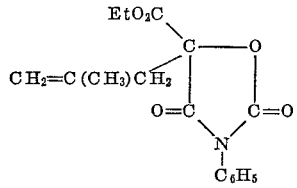 |
| $C_6H_5-C(CH_3)=CH_2$ | 100 | 4 | $-CH_2-C(C_6H_5)=CH_2$ |
| $(CH_3)_2C=CH-CH_3$ | 170 | 4 | $-CH(CH_3)\overset{CH_3}{\underset{|}{C}}=CH_2$ |
| $(CH_3)_2C=C(CH_3)_2$ | 180 | 18 | $-C(CH_3)_2\overset{CH_3}{\underset{|}{C}}=CH_2$ |
| $C_6H_{13}-CH=CH_2$ | 140 | 18 | $-CH_2CH=CHC_5H_{11}$ |
| $C_2H_5-CH=CH-C_2H_5$ | 180 | 18 | $-CH(C_2H_5)CH=CHCH_3$ |
| $C_{10}H_7-CH_2-CH=CH_2$ | 140 | 4 | $-CH_2CH=CHC_{10}H_7$ |
| $C_6H_5-CH=CH-CH_3$ | 200 | 48 | $-CH(C_6H_5)CH=CH_2$ |
| $CH_2=C(CH_3)-CH_2Cl$ | 180 | 18 | $-CH_2C(CH_3)=CHCl + -CH_2C(CH_2Cl)=CH_2$ |
| $ClC_6H_4-CH_2-CH=CH_2$ | 140 | 4 | $-CH_2CH=CHC_6H_4Cl$ |
| $C_6H_5-CH_2-CH=CH-CH_3$ | 140 | 18 | $-CH(CH_3)CH=CHC_6H_5$ |
| $C_{16}H_{33}-CH=CH_2$ | 140 | 4 | $-CH_2CH=CHC_{15}H_{31}$ |
| $C_6H_5CH_2CH=CH_2$ | 130 | 6 | $-CH_2CH=CHC_6H_5$ |
| $CH_3(CH_2)_3C\equiv CH$ | 135 | 18 | $-CH=C=CH(CH_2)_2CH_3$ |
| $CH_3CH_2C\equiv CCH_2CH_3$ | 165 | 18 | $-\underset{\underset{CH_2CH_3}{|}}{C}=C=CHCH_3$ |

EXAMPLE 4

A mixture of 23 parts of the diethyl methallyl tartronate of Example 1 and 24 parts of phenyl isocyanate is reacted by heating together without either diluent or catalyst in a glass flask under a reflux condenser for 18 hours at 215° C. and the product is then isolated by distillation under reduced pressure. The part distilling at 140–155°/0.4 mm. crystallizes slowly on cooling. Recrystallization from 100 parts of 80% ethanol gives 3-phenyl-5-methallyl-5-carbethoxy-oxazolidine-2,4-dione.

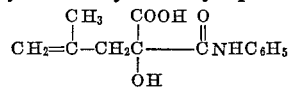

It is a white solid melting at 77–78°.

Calculated for $C_{16}H_{17}NO_5$: 63.5% C, 5.7% H, 4.6% N. Found: 63.7% C, 5.8% H, 4.4% N. The infrared spectrum as well as the composition of the subsequent saponification and decarboxylation products confirm the structure of this material.

A mixture of 3 parts of this product with one equivalent of 0.2 N aqueous sodium hydroxide is heated on a steam bath with intermittent shaking for four hours. When the pH of the solution reaches 7 half of the solid (which melts to a viscous oil on the steam bath) has dissolved. The clear solution is decanted, cooled and acidified. The resulting precipitate crystallizes very slowly. Recrystallization from chloroform-hexane (1:1) gives 2-hydroxy-2-carboxy-4-methyle-pent-4-enoic anilide $$CH_2=\underset{\underset{OH}{|}}{\overset{\overset{CH_3}{|}}{C}}-CH_2\underset{}{\overset{\overset{COOH}{|}}{C}}-\overset{O}{\overset{\|}{C}}NHC_6H_5$$

melting at 110–110.5 with evolution of gas. The structure is confirmed by the infrared absorption spectrum.

Calculated for $C_{13}H_{15}NO_4$: 62.7% C, 6.1% H, 5.6% N. Found: 62.3% C, 6.2% H, 5.6% N.

Heating this material for 3 hours at 140° causes an evolution of gas and yields a solid which, after crystallization from heptane, melts at 88–89°.

The infrared spectrum of this material is consistent with 2-hydroxy-4-methyl-pent-4-enoic anilide.

Calculated for $C_{12}H_{15}NO_2$: 70.3% C, 7.4% H, 6.8% N. Found 70.0% C, 7.3% H, 6.9% N.

When the procedure of Example 4 is employed using the substituted-allyl tartronates for Example 3 with phenyl isocyanate the products are 5-substituted-allyl oxazolidinediones of analogous structure. Thus when diethyl allyltartronate, diethyl 3-phenylallyl tartronate and diethyl oct-2-enyltartronate are employed, the products are respectively 3-phenyl-5-allyl-5-carbethoxyoxazolidone-2,4-dione, 3 - phenyl-5-(3-phenylallyl)-5-carbethoxyoxazolidone-2,4-dione and 3-phenyl-5(oct-2-enyl)-5-carbethoxy-oxazolidone-2,4-dione.

EXAMPLE 5

When the procedure of Example 4 is repeated employing 23 parts of diethyl methallyltartronate and 20 parts of butyl isocyanate, the product is 3-butyl-5-methallyl-5-carbethoxy-oxazolidone-2,4-dione. Likewise the use of p-nitrophenyl, methyl, and p-tolyl isocyanates leads to the formation of oxazolidine-diones having these respective groups on the nitrogen atom. These are 3-p-nitrophenyl-5-methallyl - 5-carbethoxyoxazolidine - 2,4-dione, 3-methyl-5-methallyl - 5-carbethoxyoxazolidone-2,4-dione and 3-p-tolyl-5-methallyl-5-carbethoxy-oxazolidone-2,4-dione, respectively. Other isocyanates which are used are ethyl, propyl, α-naphthyl, β-naphthyl, p-methoxyphenyl isocyanates and the like.

EXAMPLE 6

A mixture of 12 parts of diethyl mesoxalate and 4 parts of allene is heated together in a closed reaction vessel for 18 hours at 150° C. The vessel is then cooled and opened and the product is distilled under reduced pressure. The material distilling at 74–76° C. at 0.25 mm. Hg pressure has a refractive index of 1,4433 at 20° C. The structure of the product, 1,1-bis(carbethoxy)-but-3-yne-1-ol, is confirmed by infrared and nuclear magnetic resonance spectroscopy.

What is claimed is:

1. Substituted tratronate esters having the formula:

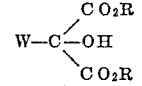

wherein R is an alkyl radical having 1 to 6 carbon atoms and W is a member of the group consisting of the monovalent radicals having the structures:

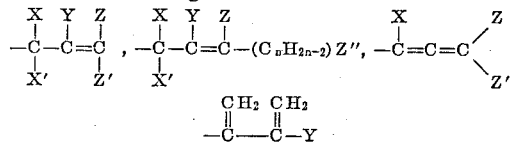

and $$-CH_2-C\equiv CH$$

wherein Z' is a member of the group consisting of hydrogen, halogen and alkyl radicals, Z" is a member of the group consisting of H and the tratronate radical —C(OH)(CO$_2$R)$_2$, $n$ is an integral number from 2 to 17, inclusive and X, X', Y and Z taken individually are selected from the group consisting of hydrogen, alkyl, cycloalkyl and aryl radicals and X' and Z taken together are a divalent alkylene radical forming, together with the 3-carbon atom chain connecting them, a stable ring system..

2. In a process for preparing the products of claim 1, the step of contacting, at a temperature from about 20° to 220° C. for a few hours under autogenous pressures, a mesoxalic ester of the formula:

$$\begin{array}{c} RO_2C \\ \phantom{RO_2}\diagdown \\ \phantom{RO_2CC}C=O \\ \phantom{RO_2}\diagup \\ RO_2C \end{array}$$

wherein R is an alkyl radical having from one to 6 carbon atoms with an unsaturated substance having at least 3 carbon atoms in the chain selected from the group consisting of $$\begin{array}{cc} X\phantom{==}Y & H\phantom{===}Y \\ \diagdown\phantom{=}\diagup & \diagdown\phantom{==}\diagup \\ C=C & C=C=C \\ \diagup\phantom{=}\diagdown & \diagup\phantom{==}\diagdown \\ X'\phantom{==}Y' & H\phantom{===}Y' \end{array}$$

$$X-C\equiv C-Y$$

wherein Y' is a member of the group consisting of hydrogen and the radicals $$-C\underset{Z'}{\overset{Z}{\diagup\mkern-6mu\diagdown}}H$$

and $$-\underset{H}{\overset{Z}{\underset{|}{C}}}(C_nH_{2n-2})Z''$$

wherein Z' is a member of the group consisting of hydrogen, halogen and alkyl radicals, Z" is a member of the group consisting of H and the tartronic ester radical —C(OH)(CO$_2$R)$_2$, $n$ is an integral number from 2 to 17 inclusive and X, X', Y and Z taken individually are selected from the group consisting of hydrogen, alkyl, cycloalkyl and aryl radicals and X' and Z taken together are a divalent alkylene radical forming together with the 3-carbon atom chain connecting them a stable ring system and provided that (1) Y' only contains a carboxylalkyl group when the molecule contains an X' group, (2) Y and Y' are hydrogen or lower alkyl when the molecule contains an allenic double bond system, (3) both X and Y' are not hydrogen when a triple bond is present, and (4) at least one hydrogen atom is present on a carbon atom adjacent to a multiply bonded carbon atom.

3. Diethyl methallyltartronate.

References Cited by the Examiner
UNITED STATES PATENTS

| | | | |
|---|---|---|---|
| 2,335,027 | 11/1943 | Ritter | 260—638 |
| 2,377,246 | 5/1945 | Kyrides | 260—535 |
| 2,648,703 | 8/1953 | Stansbury et al. | 260—484 |
| 2,786,073 | 3/1957 | Stansbury et al. | 260—484 |
| 2,977,370 | 3/1961 | Oken | 260—307 |
| 2,977,371 | 3/1961 | Dixon | 260—307 |

OTHER REFERENCES

Achmatowicz: Chem. Abs., vol. 54, p. 13056 (1960).
Achmatowicz: Chem. Abs., vol. 53, pp. 3183–84 (1959).

LORRAINE A. WEINBERGER, *Primary Examiner.*

DURAL McCUTCHEN, LEON ZITVER, *Examiners.*